Patented June 17, 1930

1,765,352

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF AMMONIA

No Drawing.     Application filed April 14, 1928. Serial No. 270,162.

This invention relates to the catalytic oxidation of ammonia to oxides of nitrogen.

In the past, ammonia has been oxidized to oxides of nitrogen at elevated temperatures by means of air or other oxidizing gases in the presence of contact masses, usually platinum gauze. The present invention is directed to the catalytic oxidation of ammonia in the presence of a new class of contact masses. The contact masses used in the present invention contain zeolites which are the reaction products of at least three classes of components, that is to say at least one silicate, at least one metallate, and at least one salt, the basic radical of which is a metal capable of entering into the non-exchangeable nucleus of a zeolite. Throughout the specification and claims these zeolites will be referred to as multi-component zeolites.

The multi-component zeolites used in making catalytic compositions of the present invention may possess high base exchanging power or in many cases may possess lower base exchanging power since the catalytic value of the final compositions is not primarily dependent on the amount of base exchanging power present.

The multi-component zeolites included in the contact masses of the present invention may be associated with diluents, preferably in the form of a physically homogeneous structure, as will be described below. Either diluted or undiluted multi-component zeolite bodies may be present in the contact masses used in the present invention and it should be understood that wherever multi-component zeolites are referred to both diluted and undiluted bodies are included.

Catalytically active components may be associated with diluted or undiluted multi-component zeolite bodies in four main forms. (1) They may be physically admixed or impregnated into the multi-component zeolite bodies. (2) They may be physically homogeneously incorporated into the multi-component zeolite bodies before the latter have been completely formed as catalytically active diluent bodies, or in the form of diluents which have been impregnated with catalytically active substances. (3) They may be chemically combined in the multi-component zeolites in non-exchangeable form, that is to say they may form part of the non-exchangeable nucleus of the multi-component zeolite present in the final contact mass. (4) They may be chemically combined in exchangeable form either during formation of the multi-component zeolite or by base exchange after formation. Obviously, of course, the same or different catalytically active components may be present in more than one of the above described forms and it is an advantage of the present invention that catalytically active substances may be introduced in a wide variety of forms which gives a large field of choice to the catalytic chemist.

While three of the methods of combination of catalytically active substances may be effected with undiluted as well as diluted multi-component zeolites I have found that for the catalytic oxidation of ammonia diluted multi-component zeolite bodies present many advantages, particularly where the diluents are of a physical nature such as to exert a desired influence on the catalytic activity of the contact masses as when, for example, the diluents by reason of high porosity, capillarity or surface energy may be considered as physical catalysts or activators.

Multi-component zeolites used in the preparation of contact masses of the present invention behave as if they were products of extremely high molecular weight for catalytically active components can be introduced either into the non-exchangeable nucleus or in the form of exchangeable bases in practically any desirable proportions, and the ordinary law of chemically combining proportions in which components can be incorporated chemically appears to be without force, which makes it reasonable to assume that the molecular weight is so high as to completely mask the effect of the law. It is, of course, possible that the multi-component zeolites, or some of them, may be solid solutions of a plurality of related compounds of lower molecular weight. It has not been possible hitherto to definitely settle this question as multi-component zeolites are not readily capable of structural chemical analysis. The present invention is, of course, not limited to any theory but irrespective of the underlying reasons the fact that catalytically active components may be chemically introduced in any desired proportions is of enormous importance to the catalytic chemist and puts him in the position of being able to produce an almost unlimited number of finely and gradually toned catalysts or contact masses for the catalytic oxidation of ammonia to oxides of nitrogen. In all cases the contact masses produced are highly effective by reason of the desirable physical structure of the multi-component zeolite bodies contained therein and the wide limits of homogeneous dilution of catalytically active molecules or atoms with resulting uniformity and smoothness of action which is of great importance.

Another important advantage of contact masses containing multi-component zeolite bodies lies in the fact that these contact masses are extremely resistant to high temperatures obtained in the oxidation of ammonia. It should be clearly understood that multi-component zeolites even though possessing the same empirical chemical formula are quite different products from the ordinary two-component zeolites of commerce which are the reaction products of only two classes of zeolites, that is to say soluble silicates and metallates or soluble silicates and metal salts. The multi-component zeolites which are used in contact masses of the present invention possess the tremendous advantage that any desired catalytically active component can be readily introduced in the form in which it is best available or most desirable. This is of great importance for when contact masses are prepared containing two-component zeolites it is sometimes impossible and frequently very difficult to introduce a number of catalytically active components for some of the component radicals are capable only of forming metallates and others are only capable of forming metal salts of a character suitable for the formation of the zeolites. The choice of components to be incorporated in a two-component zeolite is, therefore, considerably narrowed whereas in the multi-component zeolites used in contact masses of the present invention components can be introduced in the particular form, that is to say metallates or metal salts, in which they are most desirable or are most readily available. This gives the catalytic chemist an enormous field of choice and constitutes one of the most important advantages of contact masses used in the present invention.

In addition to the important characteristics with which multi-component zeolite bodies endow the contact masses of the present invention, it has been found that in many cases it is desirable to stabilize the contact masses and this may be effected by associating with the multi-component zeolite bodies or incorporating or forming therein compounds of the alkali-forming metals, that is to say the alkali metals, the alkaline earth metals, and the strongly basic earth metals. These compounds appear to slow up or smooth out the catalytic reaction and will be referred to throughout this specification and claims as stabilizers. The stabilizers may be non-alkaline, weakly alkaline, or strongly alkaline, depending on the nature of the contact mass desired and on the reaction conditions under which it is to be used. It is an important advantage of the present invention that in most multi-component zeolites a greater or less amount of alkali forming metal oxides are present as exchangeable bases, and they form stabilizers which are combined in or associated with the resulting multi-component zeolite bodies in an extremely fine state of division in which the activity of the stabilizers is peculiarly effective. Thus, multi-component zeolite bodies containing alkali forming metal exchangeable bases may be considered as complex stabilizers.

In addition to the use of stabilizers, which are important in connection with many of the contact masses used in the present invention, it has been found that the stabilizer action and the over-all efficiency of the contact masses can, in many cases, be greatly increased or enhanced by the association therewith or chemical combination therein of elements or radicals or groups which are catalytically active but which do not possess specific catalytic activity for the oxidation of ammonia to oxides of nitrogen. Thus, for example, it will be noted that the reaction involves the production and splitting off of water. For this reason it is desirable in many of the contact mass compositions of the present invention to incorporate or include catalysts or catalytic components which are not specific catalysts for the oxidation of ammonia to the oxides of nitrogen but which may favor dehydration. In other cases different non-specific catalysts may be used and are of importance. Thus, for example, when coal tar ammonia is being oxidized, it is necessary to burn out the organic impurities present and while some catalytic components which are oxidizers of ammonia to oxides of nitrogen also favor the selective catalytic combustion of organic impurities, in other contact masses components may be incorporated which favor the selective catalytic combustion of organic impurities or their transformation into compounds which are harmless or easily separated from the final product may not be specific catalysts for the oxidation of ammonia to oxides of nitrogen, at least under the reaction temperatures used. In this connection it should be noted that the effectiveness of different catalytic components will vary with the temperature at which the reaction takes place and that at one temperature a component may be a specific catalyst whereas at another temperature, frequently a lower reaction temperature, the particular component may no longer be a specific catalyst. These non-specific catalysts will be referred to throughout the specification and claims as "stabilizer promoters" and the expression is intended to have no other meaning. The concept of stabilizer promoters is therefore not intended to define the chemical individuals or groups but is relative and refers to the action of the catalytic groups under the reaction conditions obtaining. The use of the expression "stabilizer promoter" should in no sense be taken to limit the invention to a particular theory of action of these non-specific catalysts and in fact in some cases stabilizer promoters may be present where there are no stabilizers.

The tremendous range of chemical groups which may be combined in or with or incorporated in multi-component zeolite bodies permits a wide choice of stabilizer promoters as well as specific catalysts and permits their association with the contact masses in an extremely homogeneous and catalytically efficient form. Thus, many multi-component zeolites may be considered as combined catalysts, stabilizers, and stabilizer promoters as all of these elements may be present in the same chemical compound and sharing the advantages flowing from its desirable physical structure and chemical properties. Of course, both stabilizer and stabilizer promoters may be mixed partly or wholly with the multi-component zeolite bodies and a single stabilizer or singly stabilizer promoter may be present partly in physical admixture and partly in chemical combination as will be clear to the skilled zeolite chemist.

The preparation and character of the multi-component zeolite catalysts of the present invention has been fully described in my prior Patent No. 1,728,732, dated September 17, 1929 and need not be repeated in detail. It is sufficient here to say that the procedure in which relatively acid components are added to the relatively alkaline components, recommended in my prior patent referred to, may also be considered as the preferred method of forming multi-component zeolites for use in contact masses of the present invention which, however, is in no sense limited to the oxidation of ammonia by means of contact masses containing multi-component zeolites produced in this manner. On the contrary many effective contact masses for the ammonia oxidation may be produced by reactions in which the converse procedure is adopted, that is to say the more alkaline components are added to the more acid components.

While, as has been stated above, the present invention includes ammonia oxidation processes in which either diluted or undiluted multi-component zeolites are used, it is preferable in most cases to utilize diluted multi-component zeolites in the contact masses for carrying out the present invention. It is desirable, though not essential, that the diluents be homogeneously incorporated into the multi-component zeolites before formation of the latter or at least before the multi-component zeolite has set after formation. Many diluents, inert, stabilizing, activating, catalytically active, or having stabilizer promoter effects, can be used. A few of the diluents will be briefly enumerated:—powdered base exchange products, natural or artificial powders of rocks, stones, tuffs, trass, lava, and similarly volcanic products which are frequently highly porous, greensand, pulverized slag wool, cements, sand, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper, iron, silver or thorium salts of the above, silicates, such as copper silicate, iron silicate, nickel silicate, cobalt silicate, aluminum silicate, titanium silicate, zirconium silicate, minerals or ores, especially those rich in copper and iron, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted or undiluted base exchange bodies or their derivatives, silicious or non-silicious, may be finely divided and used as part or all of the diluents of the multi-component zeolites used in the contact masses of the present invention.

The following nine methods are the most effective for the introduction of diluents but any other suitable methods can be used.

(1) The diluents may be mixed with one or more liquid components of the multi-component zeolite to be formed when the latter are prepared by wet methods.

(2) Components, either catalytically active, stabilizer promoters, or others, may be precipitated or impregnated into diluent bodies which are then incorporated into the multi-component zeolite by any suitable methods of incorporation.

(3) Diluents may be mixed with multi-component zeolites when the latter are still in the form of gels, by kneading or stirring, in which case the base exchange gel behaves as an adhesive. The homogeneity and uniformity of the distribution of the diluents is of course not quite so great by this method as by method (1), but for the oxidation of ammonia extreme uniformity is not essential.

(4) Diluents may be formed during the formation of the multi-component zeolites by mixing suitable compounds with the components of the multi-component zeolites so that the diluent particles are precipitated during formation. Protective colloids may be added to prevent coagulation of the diluent particles before the multi-component zeolites have become sufficiently set.

(5) Compounds may be added which react with certain of the multi-component zeolites forming components to produce diluents, for instance salts of the metal acids of the fifth and sixth groups may be added in sufficient excess so that they react with components of the multi-component zeolite to form insoluble diluents, as for example with heavy metal oxides.

(6) Preformed multi-component zeolites, diluted or undiluted, artificial or natural, can be impregnated with true or colloidal solutions of catalytically effective components and then dried.

(7) A preformed multi-component zeolite, diluted or undiluted, may be impregnated with a plurality of solutions which react therein to precipitate any desired diluents.

(8) Soluble diluent compounds may be added to the components forming a multi-component zeolite, which after formation retains the compounds in solution and is dried without washing or is treated to precipitate the compounds.

(9) Natural multi-component zeolites or artificial multi-component zeolites, diluted or undiluted, or their derivatives, may be impregnated with solutions of the desired compounds, which are then precipitated by means of reactive gases.

The nucleus or non-exchangeable portion of the molecules of the multi-component zeolites may be considered to contain two types of oxides, namely, relatively basic metal oxides, usually amphoteric, and relatively acidic oxides, such as $SiO_2$ and certain other oxides of similar properties which can replace part of the $SiO_2$. The nucleus behaves as a single acid radical and cannot be split by ordinary chemical means without far-reaching decomposition but it is advantageous to consider the two portions of the nucleus as basic and acidic portions bearing in mind, of course, that the nucleus behaves as a single group. The metal components which are capable of forming the basic portion of the nucleus are salts or metallates of the following metals:—copper, silver, gold, bismuth, beryllium, zinc, cadmium, boron, aluminum, titanium, zirconium, tin, lead, thorium, niobium, antimony, tantalum, chromium molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts for the oxidation of ammonia, others are stabilizers and still others are stabilizer promoters. The status of an element as catalyst or stabilizer promoter may vary with the particular reaction conditions and with the nature of the contact mass.

Examples of components forming the relatively acid portion of the multi-component zeolite nucleus are alkali metal silicates, which are soluble in alkali, and alkali metal salts of acids, such as those of boron, phosphorus, nitrogen, etc.

The exchangeable bases of the multi-component zeolites may be substituted by base exchange, and the elements which can be introduced singly or in admixture by base exchange are the following:—copper, silver, gold, ammonium, beryllium, calcium, manganese, zinc, strontium, cadmium, barium, lead, aluminum, titanium, zirconium, tin, antimony thorium, vanadium, thallium, bismuth, chromium, uranium, manganese, iron, cobalt, nickel, palladium, platinum, and cerium.

The exchangeable bases introduced may be specific catalysts, they may be stabilizers, or they may be stabilizer promoters. They may be introduced as simple ions or as complex ions and may enhance the catalytic activity of the final contact mass, improve its physical strength, or both.

Multi-component zeolites may also be coated in the form of films on massive carrier granules or may be impregnated therein. The massive carriers may be inert, activating, or themselves catalysts.

The present invention may be carried out as a single catalytic reaction, namely, the oxidation of ammonia to oxides of nitrogen, and where a pure ammonia, such as, for example, ammonia catalytically synthesized from its elements, is used this will be the normal reaction. It is, however, an advantage of the present invention that effective composite contact masses may be used and impure ammonia can be oxidized with concomitant selective transformation of impurities into easily separable or unobjectionable products. This, for example, ammonia produced as a by-product from the distillation of coal, wood, and other products is normally contaminated with considerable amounts of organic impurities or impurities containing sulfur, either inorganic, such as hydrogen sulfide, or organic. It is quite common for such by-product ammonia to contain considerable amounts of phenols. When such an impure ammonia is passed over a suitable contact mass containing a multi-component zeolite body the organic and other impurities are oxidized to easily separable or harmless products and at the same time the ammonia is oxidized to oxides of nitrogen. Naturally, of course, the reaction may or may not be absolutely simultaneous and there is reason to believe that with composite contact masses a selective oxidation of impurities takes place before the ammonia is oxidized. In some modifications of the present invention it is also desirable to arrange the catalyst in zones, for example, permitting gases first to encounter the contact masses which favor the selective oxidation of impurities and then to encounter a contact mass which permits the oxidation of ammonia to oxides of nitrogen. The zones may be separated or contiguous.

The present invention is not concerned with a particular temperature and the temperature ranges which have been used with other contact masses and which normally run from 500–800° C. may be employed and the optimum temperature will of course depend on the precise nature of the contact mass utilized. The proportions of reacting ingredients may also vary and the reaction may be carried out at atmospheric pressure or at pressures above or below the atmosphere. A few representative processes coming within the scope of the present invention will be set forth in greater detail in the following specific examples, it being clearly understood that the invention is not limited thereto.

Example 1

The following three solutions are prepared:

1. 24 parts of $SiO_2$ in the form of 33° Be. sodium waterglass solution are diluted with 6–7 volumes of water.

2. A 5% sodium aluminate solution is prepared from a corresponding aluminum nitrate solution containing 5 parts of $Al_2O_3$.

3. 50 parts of ferric nitrate with 9 mols of water are dissolved in water to form a 10% solution.

50 parts of a mixture of rare earths, monazite sand or monazite sand refuse are added to solution 1 and then the aluminate solution is poured in with vigorous agitation. To this mixture is then added sufficient ferric nitrate solution so that a slight alkalinity to phenolphthalein remains, the addition to be effected with vigorous stirring. The gelatinous precipitate obtained is a three-component zeolite containing aluminum and iron in non-exchangeable form and rare earths embedded as diluents. The gel is separated from the mother liquor by pressing, is thoroughly washed with water, dried at temperatures preferably below 100° C., and the cake broken into pieces. If desired, the fragments may be hydrated with water and the contact mass can be used for the catalytic oxidation of ammonia to oxides of nitrogen. When an ammonia-air mixture containing from 5–15% ammonia is passed over the contact mass at 650–850° C. good yields of nitrogen oxides are obtained.

Modified contact masses can be prepared by replacing part or all of the metallate by other metallates, for example metallates of lead, zinc or chromium, singly or in admixture. The ferric nitrate can also be replaced partly or wholly by other metal salt solutions, such as those of copper, thorium, manganese, zirconium, nickel, cobalt or chromium, singly or in admixture.

The proportions of the ingredients reacting to form the above described contact masses can be varied but the amounts should be so chosen that after the reaction is completed the product remains strongly alkaline to litmus and preferably neutral or alkaline to phenolphthalein.

Modified contact masses may be produced by introducing metal oxides by base exchange which can be effected in the ordinary manner by trickling 3–5% metal salt solutions over the zeolite, especially when warmed to 40–60° or by suspending the zeolite in a salt solution. Among the salt solutions which favorably affect catalytic efficiency of the contact mass are those containing salts of calcium, magnesium, barium, silver, copper, zinc, cerium, cobalt, magnesium, or thorium. They may be used singly or in admixture. Contact masses in which the exchangeable alkali is replaced by the metal oxides of the above salts possess in general a higher efficiency and especially tend to avoid the decomposition of ammonia and nitrogen oxides to elementary nitrogen.

The contact masses described contain diluent bodies but these latter are not necessary although they are advantageous for the production of economical and effective contact masses. Catalytically active diluents may be used containing one or more of the elements or oxides which have been enumerated above. Another class of diluents consists of those which have stabilizer or stabilizer promoter actions and, of course, diluents having more than one of these characteristics may be incorporated. Metal oxides of the iron group impregnated with 2–3% of bismuth oxide form very effective diluents.

Copper oxide, manganese oxide, thorium oxide, cerium oxide, or mixed oxides containing iron and copper, iron and bismuth, iron and cerium, iron and lead, or iron and thorium may be used in varying amounts.

*Example 2*

36 parts of $V_2O_5$ are dissolved in 33.6 parts of 100% KOH and 900 volumes of water, to which solution 250 parts of kieselguhr are added. A solution containing 52.8 parts of ferric sulphate is added to the suspension with vigorous agitation in order to precipitate iron vanadate uniformly throughout the kieselguhr. The reaction mixture after being freed from the mother liquor is suspended in a potassium aluminate solution prepared by treating 88.8 parts of aluminum sulphate containing 18 mols of water with the necessary amount of caustic potash dissolved in 600 parts of water. The suspension is then treated with 123 parts of 33° Be. potassium waterglass. A 10% solution of thorium nitrate containing 12 mols of water is added to the suspension until the reaction mixture remains alkaline to phenolphthalein. The gelatinous precipitate is freed from the mother liquor by pressing, washed to remove a maximum of the excess alkali, dried at 100° C., and then broken into pieces. The contact mass may be used as it is but preferably the exchangeable alkali should be replaced by cobalt oxide or copper oxide by the usual methods of base exchange. This contact mass can be used for the oxidation of very impure ammonia such as obtained in coal tar distillation. Coal tar ammonia containing small amounts of phenolic impurities and mixed with air so as to constitute 5–8% by volume of the air is passed over the contact mass at 750° C., good yields of nitrogen oxides being obtained.

Instead of carrying out the reaction as described above, the contact mass may be used as a preliminary contact mass for the catalytic purification of coal tar ammonia resulting in the burning out of the impurities without attacking the ammonia. When used for this purpose the coal tar ammonia mixed with air in the proportion of 5–10% by volume is passed over the contact mass at 400–450° C., a high-grade, pure ammonia being obtained as the phenolic and other impurities are completely burned out. The resulting ammonia-air mixture, after washing with water or alkali if necessary, is passed over the contact mass described in Example 1 at 650–800° C. resulting in good yields of nitrogen oxides.

In the catalytic purification of coal-tar ammonia small amounts of hydrocyanic acid are often obtained and may be separated out before using the ammonia-air mixture for the catalytic oxidation of ammonia but it has been noted that the hydrocyanic acid does not affect the catalytic efficiency and is itself more or less completely oxidized to nitrogen oxides.

*Example 3*

1. 50 parts of $SiO_2$ in the form of a commercial sodium waterglass solution are diluted with 8–10 volumes of water.
2. A 10% sodium aluminate solution containing 8–10 parts of $Al_2O_3$ is prepared from a corresponding aluminate nitrate solution.
3. 10 parts of basic copper carbonate are dissolved in 5% ammonia water to form a solution of the corresponding cuprammonium compound.
4. 35 parts of cobalt nitrate containing 6 mols of water are dissolved in water to form a 10% solution.

The waterglass and aluminate solutions are poured together and the complex copper compound added with vigorous agitation. Thereupon the cobalt nitrate solution is poured in in a very thin stream with vigorous agitation, the amount added being such that the reaction mixture just remains alkaline to phenolphthalein. The greenish gel formed is freed from the mother liquor by pressing and is then washed thoroughly with water and dried at temperatures preferably below 100° C. The multi-component zeolite obtained is then hydrated with water, pulverized and coated onto unglazed porcelain fragments using milk of lime as an adhesive. The contact mass is then filled into a suitable converter and an ammonia-air mixture containing 8–9% of ammonia is passed over the contact mass at 750° C., good yields of nitrogen oxides being obtained.

This application is in part a continuation of my Patent No. 1,728,732, dated September 17, 1929.

What is claimed as new is:

1. A method of oxidizing ammonia to oxides of nitrogen, which comprises passing ammonia admixed with an oxygen containing gas at an elevated temperature over a contact mass containing a multi-component zeolite.

2. A method of oxidizing ammonia to oxides of nitrogen, which comprises passing ammonia admixed with an oxygen containing gas at an elevated temperature over a contact mass containing a diluted multi-component zeolite.

3. A method of oxidizing ammonia to oxides of nitrogen, which comprises passing ammonia admixed with an oxygen containing gas at an elevated temperature over a contact mass containing a multi-component zeolite, at least one of the catalytically effective components of the contact mass being chemically combined in the multi-component zeolite.

4. A method of oxidizing ammonia to oxides of nitrogen, which comprises passing ammonia admixed with an oxygen containing gas at an elevated temperature over a contact mass containing a multi-component zeolite, at least one of the catalytically effective components of the contact mass being chemically combined in the multi-component zeolite in non-exchangeable form.

5. A method of oxidizing ammonia to oxides of nitrogen, which comprises passing ammonia admixed with an oxygen containing gas at an elevated temperature over a contact mass containing a diluted multi-component zeolite, at least one of the diluents being catalytically active.

6. A method of oxidizing ammonia to oxides of nitrogen, which comprises passing ammonia admixed with an oxygen containing gas at an elevated temperature over a contact mass containing a multi-component zeolite, the contact mass containing at least one stabilizer.

7. A method of oxidizing ammonia to oxides of nitrogen, which comprises passing ammonia admixed with an oxygen containing gas at an elevated temperature over a contact mass containing a multi-component zeolite, the contact mass containing at least one stabilizer promoter.

8. A method of oxidizing impure ammonia containing oxidizable impurities, which comprises bringing about reaction between the ammonia and an oxygen containing gas at an elevated temperature in the presence of a contact mass containing a multi-component zeolite and favoring the selective oxidation of impurities.

9. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a multi-component zeolite.

10. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a diluted multi-component zeolite.

11. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a multi-component zeolite, at least one catalytically active component being chemically combined in the multi-component zeolite.

12. A method of oxidizing impure ammonia containing oxidizable impurities, which comprises passing a mixture of the ammonia and an oxygen containing gas over a contact mass which favors the selective oxidation of the impurities but which does not favor oxidation of ammonia at the temperature used, and then passing the purified ammonia admixed with an oxygen containing gas over a contact mass favoring the oxidation of ammonia, at least one of the contact masses containing a multi-component zeolite, at least one catalytically active component being chemically combined in the multi-component zeolite in non-exchangeable form.

13. A method according to claim 9, in which the reaction temperature during the selective oxidation of the impurities is lower than the reaction temperature during the oxidation of the ammonia.

14. A method according to claim 9, in which both contact masses contain multi-component zeolites.

15. A method according to claim 9, in which both contact masses contain multi-component zeolites and the selective oxidation of the impurities takes place at a lower reaction temperature than the oxidation of the ammonia.

Signed at Pittsburgh, Pennsylvania, this 12th day of April, 1928.

ALPHONS O. JAEGER.